April 29, 1930. S. A. GRUBER 1,756,353

REPAIR SHIM FOR BRAKE LININGS

Filed May 21, 1929

INVENTOR
Samuel A. Gruber,
by Edward A. Lawrence
his attorney

Patented Apr. 29, 1930

1,756,353

UNITED STATES PATENT OFFICE

SAMUEL A. GRUBER, OF VERONA, PENNSYLVANIA, ASSIGNOR OF ONE-HALF TO HYATT M. CRIBBS, OF VERONA, PENNSYLVANIA

REPAIR SHIM FOR BRAKE LININGS

Application filed May 21, 1929. Serial No. 364,770.

In case of either inwardly or outwardly expanding brakes, such for instance as are used on motor vehicles, the lining is attached by rivets to the brake band. In time the lining tends to wear so as to improperly or unevenly contact with the brake drum and thus impair or destroy the braking action.

Again the wear on the brake lining exposes the rivet heads so that they contact with the drum surface causing squeaking and also tending to score the drum surface.

The object which I have in view is the provision of a repair device which may be quickly and conveniently applied and which will restore the brakes to the proper efficiency, prolong the effective life of worn brake linings and also prevent contact between the rivets and the drum surface.

Generally speaking my invention comprises a relatively thin metal shim which may be driven between the brake lining and the brake band, the shim being so formed as to straddle the rivets.

I also provide means for fixing the shim in place.

In the accompanying drawings, in which I have illustrated the principles of my invention, Fig. 1 is a view in perspective of the band and brake lining of an outwardly expanding brake.

Figure 1:
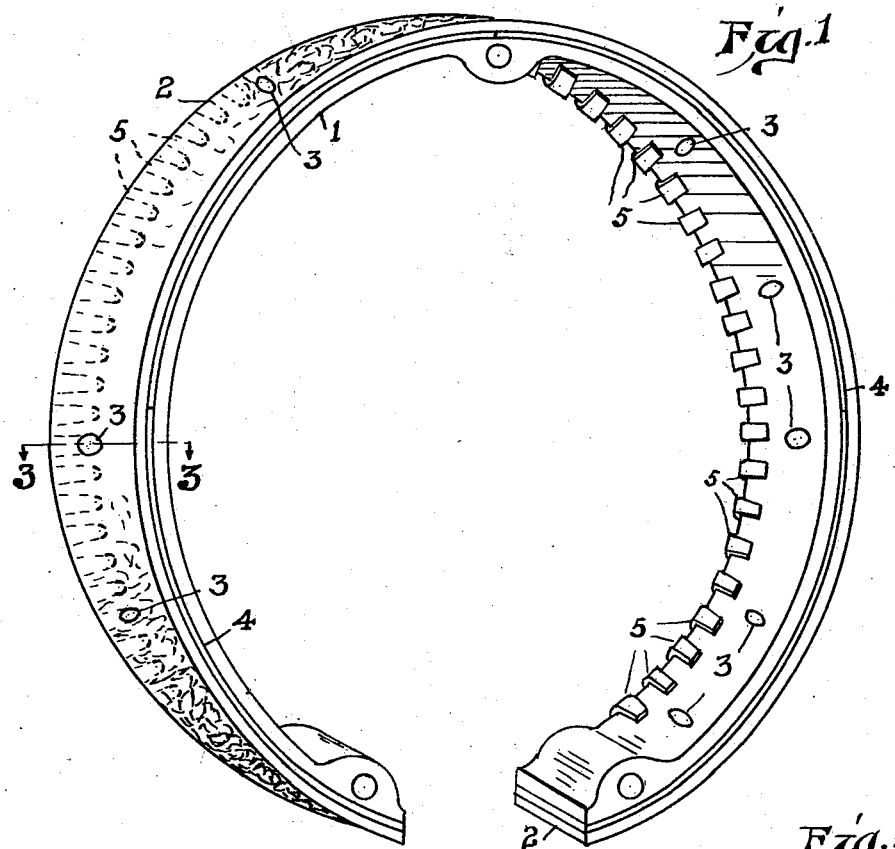
Figure 2:
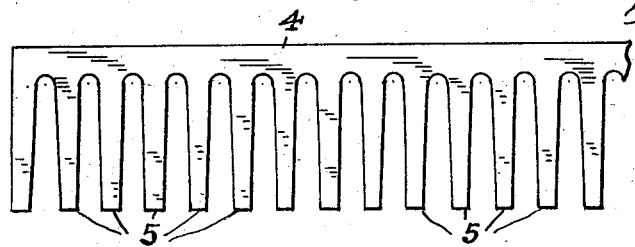
Fig. 2 is a plan view of my improved repair device.

Referring to the drawings, 1 represents the ordinary brake band, illustrated as of the outwardly expanding type and having suitable connections at its end. 2 represents the brake lining attached on the brake band by means of the rivets 3.

The repair shim comprises a relatively thin metal strip 4 of somewhat greater width than that of the brake band and lining.

Figure 3:
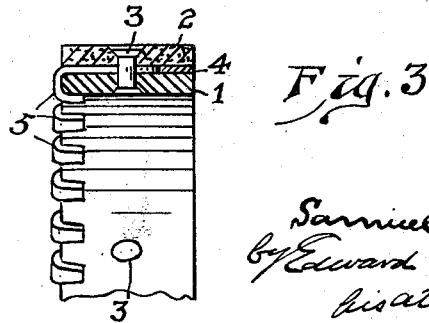
Fig. 3 is a sectional view taken along the line 3—3 in Fig. 1.

The strip of metal is stamped or cut to form the spaced apart fingers 5 which extend inwardly from one of the lateral edges of the strip but stop short of the opposite edge of the strip to leave the continuous web or backing shown best in Fig. 3.

The shim is cut to the proper length for the purpose in hand and is driven in between the brake band 1 and the lining from one side, the fingers 5 straddling the rivets 3. When the continuous or web edge of the strip is flush with the edges of the brake band and lining, the ends of the fingers 5 which protrude at the other side are bent back over the edge of the brake band, thus clinching the device in place.

My improved repair shim may be applied to inwardly contracting brake bands with equally good results.

The application of my improved repair shim sets up the worn lining so that it will properly and evenly grip the brake drums and will prevent squeaking and scoring of the brake drums by holding the rivets out of contact with the latter.

The spaced apart fingers of the shim will impart a more or less wavy or undulating gripping surface to the lining, thus forming vacuum pockets when tightened against the drum and improving the braking effect.

Again the fingers of the shim being of thin metal and spaced apart will act as fins to radiate the heat arising from braking friction, thus aiding in keeping the brakes from overheating.

The shims may be applied quickly and conveniently on the road without requiring either special tools or skill.

What I desire to claim is:—

A repair shim for a brake lining riveted on a band comprising a thin metal strip provided with spaced apart fingers extending inwardly from one lateral edge so that the shim may be driven between the lining and its supporting band, the fingers straddling the rivets, and the fingers being of sufficient length to protrude past the lining and the band, so as to be clinched back over the band to clamp the shim in place.

Signed at Verona, Pa. this 10th day of May 1929.

SAMUEL A. GRUBER.